Feb. 27, 1968 V. B. BUSHWAY 3,371,157

FREQUENCY DIVISION MULTIPLE TRACK RECORDING OF WIDEBAND SIGNALS

Filed Feb. 28, 1964 2 Sheets-Sheet 1

INVENTOR:
Vernon B. Bushway

By Smyth, Roston & Pavitt
Attorneys

Feb. 27, 1968 V. B. BUSHWAY 3,371,157

FREQUENCY DIVISION MULTIPLE TRACK RECORDING OF WIDEBAND SIGNALS

Filed Feb. 28, 1964 2 Sheets-Sheet 2

INVENTOR:
Vernon B. Bushway
By Smyth, Roston & Pavitt
Attorneys 3,371,157
FREQUENCY DIVISION MULTIPLE TRACK RECORDING OF WIDEBAND SIGNALS Vernon B. Bushway, Woodland Hills, Calif., assignor to Minnesota Mining and Manufacturing Company, St. Paul, Minn., a corporation of Delaware
Filed Feb. 28, 1964, Ser. No. 348,160
15 Claims. (Cl. 178—6.6)

ABSTRACT OF THE DISCLOSURE

This invention relates to a system for converting a wide band signal such as a video signal into a plurality of continuous signals which are recorded in different tracks on a medium such as a tape. The invention is especially adapted to minimize the effects of tape skew in such a system.

For example, when the wide band signal represents color information, it has a range of approximately 6 megacycles. This color information may be converted by this invention to a plurality of continuous signals each having a range of approximately 1.5 megacycles and each recorded in a separate track on the tape. The invention also includes a system for reproducing the low band signals from the tape and combining the signals in a particular relationship to reproduce the wide band signal.

The invention includes a control generator which generates signals having suitable characteristics to vary between particular values such as +1 and −1. A pair of additional signals may have the same frequency and have a particular phase displacement, such as 90°, relative to each other. A fourth signal having a frequency approximately twice as great as that of the pair of additional signals is also produced. Each of these signals modulates the wide band signal to produce a product signal. Each of the product signals is filtered in a separate channel by a low pass filter constructed to pass signals in a particular frequency range such as approximately 1.5 megacycles. Each of the resultant signals is recorded in a spaced track on a medium such as a tape.

A pair of reference signals may also be recorded in a pair of spaced reference tracks on the medium such as the tape. The reference signals may be recorded on a continuous basis or may be recorded only during the production of the horizontal sync signal for each horizontal line of information.

To reproduce the wide band signal, the signals recorded in the separate tracks on the tape are reproduced by magnetic heads from the tape. The signals are then modulated with signals having characteristics corresponding to the characteristics of the modulating signals in the recording operation. The signals are then delayed for a controlled interval of time and are filtered to pass the signals in the particular range such as approximately 1.5 megacycles and are combined to reproduce the wide band signal.

The reference signals are compared in phase to produce a control signal having characteristics dependent upon such relative phase. These control signals are used to delay the modulated signals for an interval of time dependent upon the characteristics of the control signal. A network may be provided to vary the characteristics of the control signal for each track in accordance with the relative disposition of the track on the tape.

The present invention relates to magnetic tape recording means for recording signals such as video signals having very wide frequency bandwidths.

In some types of electrical equipment, such as data processing equipment and computers, the data signals frequently cover a bandwidth from about zero to at least 2½ megacycles, while present day television systems employ video signals covering a bandwidth that extends from about zero to 5 or 6 megacycles. In order to record and reproduce such wideband signals, it is customary to employ magnetic tape recording equipment. However, such equipment has many characteristics which limit the range of the frequency response. For example, the response characteristics of the recording and reproducing heads and the density that the information can be packed on the tape are limiting factors. One means that can be employed to improve the frequency response is to increase the speed at which the tape moves past the heads. However, when the signals are in the megacycle range, the tape speeds become very high. In an effort to reduce the overall length of the tape, the diameter of the reel upon which it is wound and the actual lineal velocity of the tape, in some forms of tape recorders, a plurality of heads are provided on a rotating drum. As the tape moves past the drum, the drum rotates and the heads scan tracks that extend diagonally across the tape. Depending upon the oblique angle of the tracks relative to the direction of movement of the tape, the velocity at which the tape moves past a head will be many times greater than the lineal velocity of the tape past the drum. The accuracy with which the signals are recorded and reproduced is dependent upon the motion of the heads being accurately synchronized with the motion of the tape and the diagonal tracks thereon. It is also necessary to synchronously switch between the successive heads so that the correct head is operative, as its respective track moves past the head. It is further necessary that the characteristics of the various heads be precisely matched with each other and that the drum and heads be carefully dynamically balanced. These are all major problems which have not been entirely satisfactorily solved.

More recently it has been proposed to employ frequency division multiplexing means to divide the wideband signal into a plurality of separate low frequency signals containing all of the intelligence of the original signal. Each of these lower frequency signals has a sufficiently narrow bandwidth to permit their being magnetically recorded by means of a slower mating tape and simpler and more reliable recording heads that are stationary and scan parallel tracks that extend longitudinally of the tape.

In order to divide the original wideband signal into a plurality of narrower band component signals, the original signal is operated on by $n$ different control signals. This will produce a plurality of complex signals that may be filtered so as to retain the time-varying coefficients of the original signal. By a proper choice of control signal frequencies and filters, each of the component signals will be in low frequency ranges. These component signals and one or more of the component signals and/or a sync signal may then be recorded to reproduce the original signal. The various component signals are reproduced and then operated upon in response to the control signals. This will then produce a plurality of complex signals that may be combined to form the original signal. Although the foregoing method can be effective to record and reproduce extremely wideband signals, there are certain practical problems that are effective to limit the accuracy of the reproduced signal. For example, the various component signals and the control signals must not be distorted or shifted in phase. Accordingly, during certain operating conditions such as occurred from so-called skew and/or flutter, the foregoing recording and reproducing systems have not been entirely satisfactory.

It is, therefore, an object of the present invention to provide a tape recording and reproducing means that will overcome the foregoing difficulty. More particularly, it is the purpose of the present invention to provide tape recording and reproducing means that will overcome the effects of tape skew and flutter, whereby a wideband signal may be recorded and reproduced without distractions thereof. This is to be accomplished by providing means that will divide the original signal into a plurality of component signals and then record the component signals and one or more reference and/or sync signals, when the signals and one or more reference and/or sync signals will be effective to insure that all of the reproduced signals will be maintained in the proper relations to insure a substantially distortion free signal.

These and other features and advantages of the present invention will become readily apparent from the following detailed description of one operative embodiment of the present invention, particularly when taken in connection with the accompanying drawings wherein like reference numerals refer to like parts, and wherein.

Figures 1, 2:
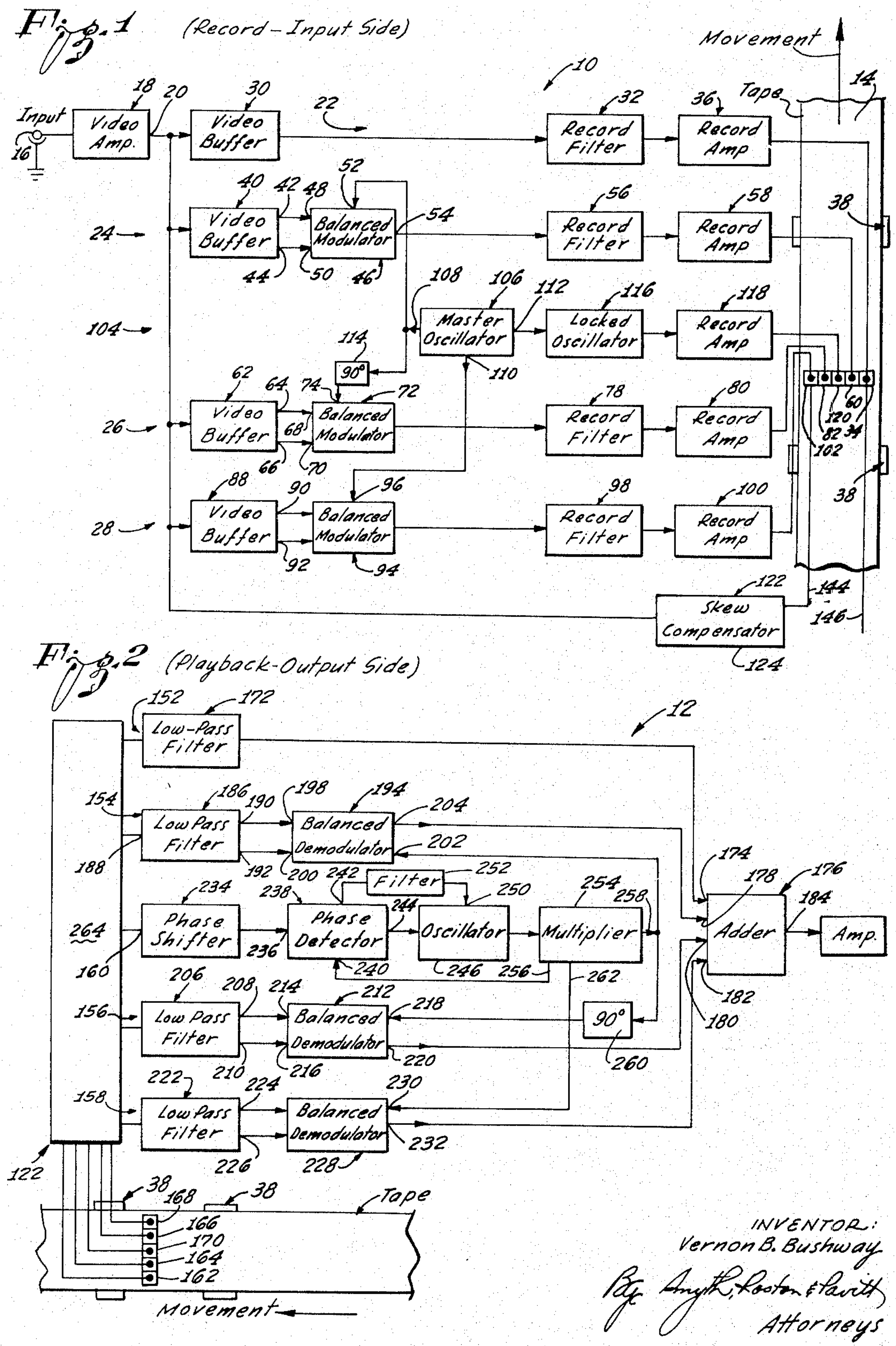
FIGURE 1 is a block diagram of a tape recording means, embodying one form of the present invention.
FIGURE 2 is a block diagram of a tape reproducing means for use with the recording means of FIGURE 1.

Referring to the drawings in more detail, the present invention is particularly adapted to be embodied in a tape recording system having a recording section 10 such as shown in FIGURE 1 for recording signals on a magnetic tape 14 and a reproducing section 12 such as shown in FIGURE 2 for reproducing the signals previously recorded on the tape 14. In the present instance, these two sections 10 and 12 are shown as being entirely separate and independent of each other so as to simplify the explanation of the present invention. However, it should be understood that if it is so desired, the two sections 10 and 12 may be integrated into a single system. As a result, these portions such as the tape transport, the magnetic heads, etc., that are identical for the two sections 10 and 12 may be made to operate in both the record mode of operation and the playback mode of operation. This will be effective to prevent an unnecessary duplication of parts.

The record section 10 includes an input 16 which is adapted to receive the signal to be recorded. This signal may be of any desired variety and may cover a very wide band of frequencies. For example, the input 16 may be connected to a data processing apparatus so as to receive the data signals such as are employed in scientific instruments, computers, data processing systems, etc. Such signals will normally be contained within a bandwidth of about 0 to about 2½ megacycles. The input 16 may alternatively be connected to a source of video signals, i.e., a television camera. Such video signals will normally be contained in a bandwidth of about 0 to 5 or 6 megacycles.

A video amplifier 18 may be provided in the input 16 so as to receive all of the signals. This amplifier 18 will be effective to increase the signal to a more useful level whereby noise and losses will be maintained within acceptable limits. The signal on the output 20 of the amplifier 18 will thus be substantially identical to the signal on the input 16 and will occupy the entire bandwidth.

The output 20 of the video amplifier 18 is interconnected with a plurality of separate channels 22, 24, 26 and 28 for dividing the video signal into the same number of components. Although any desired number of channels may be employed in the present instance there are four separate channels. As a result, the video signal will be divided into four separate component signals with each of the signals occupying a bandwidth equal to approximately one-fourth of the original bandwidth. Thus, if the original signal covers a bandwidth of 0 to 5 or 6 megacycles, each of the component signals will cover a band of 0 to 1¼ to 1½ megacycles.

The first channel 22 includes a video buffer 30 that is interconnected directly with the output 20 of the video amplifier 18. The buffer 30 will thus receive the full video signal from the amplifier 18. One of the primary purposes of the buffer 30 is to isolate the first channel 22 from the video amplifier 18 and from the other channels 24, 26 and 28. As previously stated, the signal from the amplifier 18 will cover the entire bandwidth. Accordingly, the entire video signal will be present on the output of the video buffer 30 in an undistorted form covering the entire bandwidth.

The record filter 32 is connected to the output from the video buffer 30 so as to receive the video signal. This filter 32 is of the low pass variety and has an upper cutoff limit approximately equal to or slightly lower than the highest frequency signal that the recorder 10 can magnetically record on the tape 14. The pass band of the filter will be identical to the frequency range of the component signal. Accordingly, the upper cutoff frequency for the filter 32 will normally be equal to $1/n$ of the bandwidth of the original signal where $n$ equals the number of channels 22 to 28. In the present instance, $n$ is equal to 4 so that if the original signal is a video signal having a maximum frequency equal to 5 or 6 megacycles, the filter will cut off at about 1¼ or 1½ megacycles. It is desirable that the filter 32 have a sharp cutoff and produce a minimum amount of variation in phase shift over its entire pass band and particularly at the lower frequency range of the pass band.

It will thus be seen that the signal at the output from the filter 32 will include a group of signals in a frequency range corresponding to the lower quarter of the original signal, i.e., extending from about zero cycles to about 1¼ to 1½ megacycles. This will thus be an analog signal that is identical to the fundamental portion of the video signal.

The output of the filter 32 is interconnected with one of the record heads 34 so as to supply the analog signal thereto. In the present instance, this interconnection includes a record amplifier 36 which is effective to amplify the analog signal to a level suitable for driving the head 34 while it is recording. The head 34 is mounted in a fixed position adjacent the magnetic tape 14 so as to scan a narrow track on the tape 14 as it moves therepast. The tape transport 38 will be effective to move the tape in a linear manner and in a longitudinal direction. As a result, the track will extend longitudinally of the tape 14 substantially parallel to the sides of the tape 14.

The head 34 will be effective to record the signal on the tape 14 by producing variations in the magnetism of the tape 12. As is well known, there is a maximum density at which the variations can be packed on a tape and accordingly in order to record high frequency signals it is necessary to employ high tape velocities. However, since the signals fed to the head 34 and thereby recorded on the track will occupy a bandwidth of from about 0 to $1/n$ of the bandwidth of the original signal, the tape velocity may be $1/n$ of the velocity that would be required if the video signal were to be recorded on the tape 14 in a single track.

The second channel 24 is similar to the first channel 22 in that it also includes a video buffer 40 that is connected to the output 20 from the video amplifier 18. The video buffer 40 will thus receive the full video signal and isolate the second channel 24 from the video amplifier 18 and the other channels 22, 26 and 28. The buffer 40 may be substantially identical to the first video buffer 30 except that it includes a pair of separate outputs 42 and 44. These outputs 42 and 44 are effective to carry the full video signal. However, the buffer 40 includes a suitable phase shifting means whereby the signals on the two outputs 42 and 44 will be exactly 180° out of phase with each other. By way of example, one of the outputs 42 may be connected to the plate of a vacuum tube while the other output 44 is connected to the cathode of the tube.

The outputs 42 and 44 from the video buffer 40 are connected to a modulator 46. Although the modulator 46 may be of any suitable variety, in the present instance, it is a so-called balanced modulator having a pair of signal inputs 48 and 50, a control input 52 and a signal output 54. The first input 48 is connected to the first output 42 of the video buffer 40 so as to receive the in phase video signal while the second input 50 is connected to the second output 44 so as to receive the out of phase video signal.

When the control signal applied to the control input 52 is at a first level, it is effective to cause the in phase signal on the input 48 to pass through the modulator 46 to its output 54. However, when the control signal is at a second level, it will cause the out of phase signal on the input 50 to pass through the balanced modulator 46 to output 54.

The control signals thereby cause the balanced modulator 46 to modulate the video signal by alternately inverting the phase of the video signal at the frequency of the control signal on the input 52. As a result, the signals on the output 54 from the modulator 46 will be the video signal modulated at a frequency and time that corresponds to the frequency and time of the control signals present on the control input 52. The resultant or modulated signal will be of a very complex nature and will cover a bandwidth that is at least as wide as the bandwidth occupied by the original video signal.

The output 54 from the modulator 46 is interconnected with the input to a record filter 56. This record filter 56 may be substantially identical to the record filter 32 in the first channel 22. More particularly, the filter 56 is of a low pass variety having a pass band that extends from approximately zero cycles to one-fourth of the bandwidth of the original signal. The filter 56 receives the wide band modulated video signal but will only pass the low frequency portion that is in a bandwidth substantially identical to the bandwidth of the analog signal fed to the record head 34.

The output of the filter 56 is connected to a record amplifier 58 that feeds a record head 60. The amplifier 58 is effective to amplify the filtered signal so that the signal will be of a sufficient amplitude for driving the recording head 60. It is desirable that the amplifier 58 have a gain that will insure the output signal being of substantially the same magnitude as the output signal from the first amplifier 36.

The recording head 60 is mounted in a fixed position adjacent the magnetic tape 14 so as to scan a second track and record the signal therein. The second track will extend longitudinally of the tape 14 parallel to the first track.

The third channel 26 may be virtually identical to the second channel 24. It includes a video buffer 62 having an input connected to the output 20 of the video amplifier 18 so as to receive the video signal and having two separate outputs 64 and 66 that are effective to provide a pair of identical video signals 180° out of phase with each other.

The two outputs 64 and 66 are interconnected to a pair of inputs 68 and 70 on a balanced modulator so as to supply the two signals to the modulator 72. The modulator 72 includes a control input 74 that will be effective to determine whether the in phase signal or the out of phase signal will be transferred to the output 76. As a consequence, the signal on the output 76 will be the video signal modulated in accordance with the control signals on the control input 74.

The output 76 of the modulator 72 is connected to the input to a record filter 78 so as to supply the modulated signal thereto. The filter 78 is of the low pass variety similar to the filters 32 and 56 in the first and second channels 22 and 24 and it will pass only the portion of the modulated signal in the same frequency range as the first and second component signals.

The output of the filter 78 is connected to a third record head 82 by means of a record amplifier 80 that is effective to amplify the filtered signal to a level suitable for driving the record head 82. This head 82 is preferably mounted in a fixed position so as to scan a third track that extends longitudinally of the tape 14 substantially parallel to the preceding tracks.

The fourth channel 28 may be identical to the second and third channels 24 and 26 except that portions thereof may operate in different frequency ranges. More particularly, the channel 28 includes a video buffer 88 having a pair of outputs 90 and 92 that provide an in phase signal on the output 90 and an out of phase signal on the output 92, a modulator 94 connected to the buffer 88 so as to modulate the video signal by passing the in and out of phase signals in response to the control signals on a control input 96, a filter 98 that passes only the lower frequency portions of the modulated signal, and a record amplifier 100 that is effective to amplify the filtered signal and drive a fourth record head 102. The fourth record head 102 is mounted in a fixed location adjacent the first three heads 34, 60 and 82 so as to lay down a fourth track.

In order to provide control signals for actuating the various modulators 46, 72 and 94, a control channel 104 is provided. The present control channel 104 includes a master oscillator 106 that generates a master signal of some predetermined frequency. Any suitable form of oscillator such as a free running one may be employed. However, since a stable and constant frequency are highly desirable, it is preferable for the oscillator 106 to be crystal controlled.

The oscillator 106 includes three separate outputs 108, 110 and 112 for providing three separate signals. The oscillator 106 includes means such as a frequency multiplier that will insure the signals on the outputs being interrelated with each other in some predetermined and constant time and frequency relationship.

The first output 108 is effective to provide a signal having a fundamental frequency. Normally, the fundamental frequency will be equal to the upper cutoff frequency of the record filters 32, 56, 78 and 98. For example, if the video signal covers a bandwidth up to 5 or 6 megacycles, the signal would normally have a frequency on the order of 1¼ or 1½ megacycles.

This output 108 is interconnected with the control input 52 to the modulator 46 so as to supply the control signal thereto. The control signal may be of any desired variety such as a sine wave or a squarewave signal having the same frequency as that produced by the master oscillator 106 and will also have the same phase. As a consequence, the control signals will be effective to alternately allow the in phase signal on the input 48 and the out of phase signal on the input 50 to reach the filter 56. The rate and time at which the in phase and out of phase signals are switched will be the same as the frequency and phase of the control signal. The modulator 46 will thus modulate the control signal with the video signal so as to produce a complex resultant signal having a very wide bandwidth. Among other things, the signal will include upper and lower side bands symmetrically disposed about the frequency of the control signal.

In the present four channel system, the control signal has a frequency equal to one-half of the maximum frequency F of the video signal. More particularly, if the video signal extends over a bandwidth of 0 to 6 megacycles, the control frequency would be 3 megacycles. An element in the video signal having a frequency of ¼F, i.e., 1¼ megacycles in a 6 megacycle signal when modulated with the control signal will produce a resultant element having a frequency of ¼F. Similarly, an element having a frequency of ¾F, i.e., 4½ megacycles—a 6 megacycle signal will result in a corresponding element having a frequency of ¼F or 1½ megacycles. It can thus be seen that all of the elements of the video signal between ¼F and ¾F will be present in the lower side bands and in a region extending from 0 cycles to ¼F or 1¼ megacycles in a 6 megacycle signal. The portions of the video signal above and below ¾F and ¼F respectively will also be present in the sidebands; however, they will be outside of the frequency range of 0 to ¼F.

The output 108 from the oscillator 106 is also interconnected with the control input 74 to the modulator 72 by means of a phase shifter 114. The two modulators 46 and 72 will thus be controlled by signals having the identical frequency. As a consequence, the modulated signal from the output 76 will include upper and lower side bands that extend over the same frequency range as the signal from output 54. In addition, the portion of the video signal between ¼ and ¾F will also be present in the resultant signal in the same band of frequencies from 0 to ¼F. However, since the control signal fed to the modulator 72 is shifted 90° by the shifter 114, the two resultant signals will not be identical. Instead, they will have a sine-cosine relationship.

The sine and cosine signals from the outputs 54 and 76 will be fed through the filters 56 and 78 so that all of the upper sideband signals and the control signals, etc., will be suppressed. The remaining or lower frequency portions will correspond to the portions of the lower sidebands resulting from the portion of the video signal in the frequency range from ¼ to ¾F. Because of the phase shift in the shifter 114, the filtered or component signals from the filters 56 and 78 will have a sine-cosine relationship. The sine and cosine component signals will flow through the two amplifiers 58 and 80 and be recorded on the second and third tracks by the record heads 60 and 82.

The second output 110 of the master oscillator 106 is effective to provide a signal having a frequency that is some predetermined multiple of the frequency from the first output 108. By way of example, this frequency may be double the first frequency so as to correspond to a second harmonic of the first control signal. The output 110 is interconnected with the control input 96 to the modulator 94 so as to supply the higher frequency control signal thereto.

The modulator 94 will then be effective to alternately pass the in phase signal and the out of phase signals in response to the higher frequency control signal. This will result in the video signal being modulated by the higher frequency signal so as to produce a resultant signal that is similar to the preceding resultant signal. This resultant signal will be very complex and will include upper and lower sidebands symmetrically disposed about the frequency of the control signal. If the control signal on the input 96 has a frequency that is double the frequency of the first control signal, i.e., is a second harmonic, it will have a frequency that is equal to the maximum frequency F. During the modulation of the video signal by this control signal, upper and lower sidebands will be produced that are symmetrically disposed about the frequency F. The portion of the video signal between ¾F and F will be present in the portion of the lower sideband between 0 and ¼F. This is in the same band of frequencies as the preceding component signals. The signal on the output from the modulator 94 will be fed through the filter 98 so that only the low frequency portion between 0 and ¼F will be passed. The resultant component signal will correspond to the second harmonic of the fundamental signals and will contain the intelligence or information in the upper ¼ of the video signal between ¾F and F. The amplifier 100 will then feed the component signal to the record head 102 whereby the fourth component will be recorded on the fourth track.

The third output 112 of the master oscillator 106 is interconnected with a locked oscillator 116. This locked oscillator 116 is driven by the signal from the master oscillator 106 whereby it will oscillate at a frequency determined by the oscillations of the master oscillator 106. This oscillator 116 will also be controlled so that the phase of the signal will be synchronized or locked with the phase of the signals from the first and second outputs 108 and 110. The frequency of the signal produced by the locked oscillator 116 is preferably within a frequency range that is included in the passband of the magnetic recording heads.

The output from the locked oscillator 116 is interconnected with an amplifier 118 similar to the previously described record amplifiers 36, 58, 80 and 100. This amplifier 118 which is interconnected with a fifth recording head 120 will be effective to increase the signal from the oscillator 116 to an adequate level for recording. The recording head 120 scans a fifth track on the tape 14 and records the synchronizing signal from the locked oscillator 116. Although this particular track does not contain any of the intelligence carried by the video signal, it will act as a synchronizing or sync track which will be effective to control the operation of the playback portion 12.

All of the record and playback heads are mounted in fixed positions so as to scan straight tracks that extend longitudinally of the tape 14. If the tape 14 moves past both the record and playback heads in the same relationship, the various component signals and the sync signals will be reproduced in exactly the same timed relationship in which they were recorded.

The physical positions of the heads can be very accurately maintained at all times. However, as a practical matter, the physical relation of the moving tape 14 and the heads cannot be maintained constant.

As the tape transport moves the tape 14 past the heads, both during recording and playback, the tape 14 tends to skew or become disposed at an angle to its direction of travel.

When skewing of the tape 14 occurs, one edge of the tape 14 advances or retreats from the opposite edge of the tape 14. A line drawn across the tape 14 normal to both edges will become cocked with one end of the line moving past the head adjacent one edge of the tape before the opposite end of the line passes the head adjacent the other edge of the tape.

It may thus be seen that if the amount of skew of the tape 14 is different during recording and playback, the component and sync signals will not be reproduced in the same time or phase relation in which they are recorded. In order to overcome the undesirable effects of skew, reference signals may be recorded on the tape 14 at the time the component and sync signals are recorded. Although the tape 14 may be skewed, the reference signals will always be located in a constant physical relation to the recorded signal and, as a consequence, if each of the component signals and sync signals are reproduced in constant timed relation to the reference signals, they will have their original phase relationships maintained.

Figure 3:
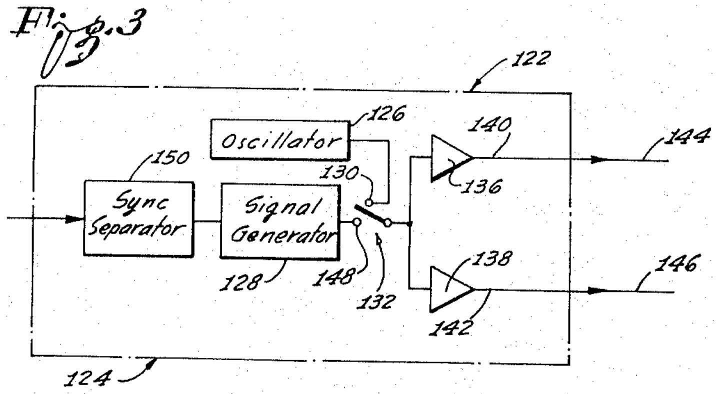
FIGURE 3 is a diagram of a portion of the recording means of FIGURE 1.

To provide these reference signals, a skew compensator 122 may be provided for recording a pair of reference signals on the tape 14 at the same time the component and sync signals are recorded. As may be seen in FIGURE 3, the record portion 124 of the compensator 122 includes means for generating reference signals. The present means includes two alternative sources of reference signals. The first source is an oscillator 126 and the second source is a reference signal generator 128.

The oscillator 126 may be of the free running variety for generating a suitable signal such as a sine wave. The oscillator 126 is conected to one of the fixed contacts 130 in a two-position switch 132. The movable contact 134 in the switch 132 is connected to the inputs of a pair of amplifiers 136 and 138. These amplifiers 136 and 138 have two separate outputs 140 and 142 that are connected to separate recording heads by the conductors 144 and 146.

These recording heads may be separate heads that are specifically provided for skew compensation. However, in the present instance, there are two of the recording heads used for recording the component or sync signals. Any of the heads may be employed but it is desirable that they be separated by a substantial distance. For example, they may be the heads such as heads 34 and 102 that scan the two tracks nearest the opposite edges of the tape 14.

The oscillator 126 is effective to generate a signal that is in the frequency band that can be recorded on the tape 14 by the heads. However, it is desirable that it be a narrow band signal such as a sine wave having a frequency that is not a critical part of the component signal being recorded by the recording head.

It can be seen that when the switch 132 is positioned to contact the fixed contact 130, a pair of reference signals will be continuously recorded on the tape 14. The signals supplied to the heads will be in phase and if there is no skewing of the tape 14 these signals will be recorded in perfect lateral alignment with each other. They will also be recorded in lateral alignment with the recorded component and sync signals.

However, if the tape 14 is skewed at the time of recording, the reference signals will not be laterally aligned with each other. Instead, one of the reference signals will be advanced in phase from the phase of the other signal by an amount that is a function of the amount of skew. In addition, the reference signals will also be displaced from the component and sync signals in the adjacent tracks as a linear function of the skewing of the tape 14.

It can be seen that when the movable contact 134 is against the fixed contact 130, a pair of reference signals will be continuously recorded on the tape 14 at all times. In some types of operation such as in a data processing apparatus, this may be a desirable mode of operation. However, in other types of service, other modes of operation may be desirable.

Since the skewing of the tape 14 is of a mechanical nature, it changes at a relatively slow rate with very little change occurring in short intervals of time. Accordingly, it is not necessary to continuously record the reference signals at all times. Instead, it will be adequate if reference signals are only periodically recorded.

Video signals are of a periodic nature in that a series of horizontal lines are recorded. These lines occur at the rate of about once each 63.5 μsecs., and are separated from each other by sync intervals. In such a short interval of time, the amount of change in the skew will be negligible. Accordingly, by placing the movable contact 134 against the fixed contact 148, reference signals from the generator 128 will be recorded only during the sync interval between the scanning of the lines.

The signal generator 128 is interconnected with a sync separator 150. The separator 150 is, in turn, connected to the output 20 of the video amplifier 18 so as to receive the full video signal. The separator 150 will be effective to strip or suppress all of the video portions from the signal and leave only the sync signals that occur between the successive scan lines.

The sync signals will be fed from the sync separator 150 to the input of the generator 128 so as to trigger the generator 128. The generator 128 will then be effective to produce a reference signal in timed relation to the synchronizing interval of the video signal. No reference signals will occur during the line portions of the video signal.

The reference signal may be of any desired variety. By way of example, it may be a narrow pulse or "spike." This reference pulse will then be coupled through the switch 132 to the amplifiers 136 and 138. The two amplifiers 136 and 138 will then couple the two reference pulses to the two recording heads 34 and 102 for recording on the tape 14.

It may be seen that in this mode of operation, the reference signals are not continuously recorded. Instead, they are recorded only during the sync interval of the video signals. However, the reference signals will have the same timed relationship to each other and to the components as in the continuous mode of operation.

The reproducing portion 12 shown in FIGURE 2 scans the various tracks and reproduces the component signals and combines them into a signal that is the same as the original video signal. The reproducing portion 12 includes four signal channels 152, 154, 156 and 158 and a synchronizing channel 160, the same number of channels as the recording means. Each of the channels 152 to 160, inclusive, includes a pickup head 162, 164, 166, 168 and 170 that are secured in fixed positions to scan one of the tracks recorded on the tape 14. The tape 14 is driven at a uniform velocity past the heads 162 to 170 by a tape transport. The pickup heads 162 to 170 are positioned in the same physical relationship as the record heads 34, 60, 82, 102 and 120 or they may be the same heads as are used to record the signals. As a result, the signals developed by the pickup heads 162 to 170, inclusive, will all have the same phase or time relationships as the component signals fed into the record heads.

The first pickup head 162 scans the first track laid down by the first record head 34 and reproduces the first component signal. This signal is identical to the analog signal representing the portion of the original signal in the frequency range of about 0 to $1/n$th of the original signal where $n$ is the number of channels, i.e., one-fourth of the original bandwidth in the present instance.

The playback head 162 is connected to a bandpass filter 172 in the channel 152. The filter 172 has a pass band that is substantially identical to the bandwidth of the component signals. Accordingly, this filter 172 may be substantially identical to the record filters. The output of the filter 172 is connected to an input 174 to an adder amplifier 176. This amplifier 176 which may be of conventional design, has several inputs 178, 180 and 182 together to form a single resultant signal on the output 184.

The second channel 154 includes the second pickup head 164. This pickup head 164 is positioned to scan the second track and reproduce the second or sine component signal recorded by the head 60. This reproduced signal is substantially identical to the fundamental sine signal from the filter 56 in the second record channel 24. This signal will thus cover a frequency band identical to the band of the signal in the first channel 152.

A filter 186 is interconnected with the pickup head 164 so as to receive the sine component signal. The signal is in a frequency band that extends from about 0 cycles to ¼ of the bandwidth of the original signal. The filter 186 accordingly has a pass band that covers approximately the same range. The filter 186 has a single input 188 but a pair of outputs 190 and 192. The filter 186 in addition to filtering the signal is also effective to divide the component signal into two identical filtered signals. The filter 186 includes phase shifting means that will shift the phase of one or both of the signals whereby the signals on the outputs 190 and 192 will be out of phase by the same amount as the two signals on the outputs 42 and 44 of the video buffer 40. In the present instance, this is 180° with the signal on the output 190 being the in phase signal and the signal on the output 192 being the out of phase signal.

The two outputs 190 and 192 from the filter 186 are connected to a balanced demodulator 194 having a pair of signal inputs 198 and 200, a single output 204 and a control input 202. The two inputs 198 and 200 are interconnected with the two outputs 190 and 192 from the filter 186 so as to receive the in phase signal and out of phase signals. The demodulator 194 is responsive to control signals on the control input 202 and will pass the in phase signal on the input 198 to the output 204 when the control signal is at one level. However, when the control signal on the input 202 is at another level, only the out of phase signal on the input 202 will be permitted to reach the output 204. The demodulator 194 will thus be effective to demodulate the second component signal at a time and frequency that is determined by the control signal on the control input 202. The resultant demodulated signal will be a complex signal that occupies an extensive band of frequencies.

The output 204 from the demodulator 194 is interconnected with the second input 178 to the amplifier 176 so as to supply the complex demodulated signal to the input 178. The amplifier 176 will then be effective to add the signals on the inputs together and produce a resultant signal.

The third channel 156 may be substantially identical to the second channel 154. The head 166 will reproduce the third or cosine component signal substantially identical to the signal from the record filter 78. The head 166 is interconnected with the input to a filter 206. This filter 206 may be a low pass filter substantially identical to the filter 186 in the second channel 154. It includes a single input and a pair of outputs 208 and 210. The two outputs 208 and 210 will contain a pair of identical signals that are totally contained within the band of frequencies included by the component signals. The filter 206 includes means for inverting the phase of one of the signals so that there will be an in phase signal present on the first output 208 and an out of phase signal will be present on the second output 210.

A demodulator 212 is interconnected with the filter 206 so as to receive the filtered signal. This demodulator 212 may be of the balanced type and substantially identical to the demodulator 194. It includes a pair of signal inputs 214 and 216 that are interconnected with the pair of outputs 208 and 210 so as to continuously receive the in phase signal and the out of phase signal, and a control signal input 218 and a single signal output 220.

When the control signal on the input 218 is at a first level, it will permit the in phase signal to reach the output 220 and when the control signal is at a second level, it permits the out of phase signal to pass through the demodulator 212 to the output 220. It may thus be seen that the demodulator 212 will be effective to demodulate the third component signal and produce a complex wide band signal. This signal will be primarily in a band of frequencies that is centered around the frequency of the control signal.

The output 220 of the demodulator 212 is interconnected with the third input 180 to the output amplifier 176. This amplifier 176 will then be effective to add the first, second and third signals together to form a resultant signal.

The fourth channel 158 is substantially identical to the second and third channels 154 and 156. The channel 158 includes the playback head 168 positioned to scan the fourth track laid down by the fourth recording head 102 and reproduce the fourth component signal. The channel 158 also includes a filter 222 having a pair of outputs 224 and 226 and a demodulator 228 that is connected to the two outputs 224 and 226. The filter 222 may be identical to the preceding filters 186 and 206 so as to limit the maximum frequency and to produce an in phase signal on the output 224 and an out of phase signal on the output 226.

The demodulator 228 includes a control input 230 and a single output 232. When the control signal is at one level the in phase signal will be present on the output 232 and if the control signal is at a second level the out of phase signal will be present on the output 232. Accordingly, demodulator 228 will be effective to demodulate the component signal from the pickup head 168 at a phase and frequency determined by the control signal on the control input 230. The output 232 from the demodulator 228 is connected to the fourth input 182 to the amplifier 176 so as to supply the demodulated signal thereto.

The four playback heads 162 to 168, inclusive, will be effective to scan the four tracks and reproduce the four component signals. These component signals will then pass through their respective channels 152 to 158 and particularly the demodulators 194, 212 and 228 so as to be supplied to the inputs 174, 178, 180 and 182 of the amplifier 176. The amplifier 176 will be effective to add all of the signals together to form a single output signal that is equal to the sum of the four signals.

The sync channel 160 provides the control signals for the inputs 202, 218 and 230 for controlling the demodulators 194, 212 and 228. This channel 160 includes the pickup head 170 positioned to scan the sync track laid down by the sync recording head 120. The recording head 170 will reproduce the sync signal generated by the locked oscillator 116. Since the sync signal is recorded in a spacial relation to the recorded component signals, the reproduced sync signal will have a predetermined time relationship to the reproduced component signals.

The output of the head 170 is interconnected with a phase shifter 234. This phase shifter 234 is preferably adjustable so as to permit the phase of the sync signal to be varied through a limited range relative to the component signals.

The output of the phase shifter 234 is interconnected with one of the inputs 236 of a phase detector 238 so as to supply the phase shifted sync signal thereto. The phase detector 238 may be of a conventional variety having two inputs 236 and 240 and a pair of outputs 242 and 244. The two inputs 236 and 240 are adapted to receive two separate signals and to compare the phase or time relationship of the two signals. Preferably the detector 238 is capable of comparing the timing of signals having different frequencies. For example, the phase detector 238 may be effective to compare the times at which the sync signal on input 236 reaches its peak amplitudes or when it crosses through zero amplitude and the time at which the level of the signal on the other input 240 passes through a particular level.

The first output 244 is effective to provide a signal that is substantially identical to the signal on the input 236. Normally, this will be a sine wave such as is fed through the phase shifter 234. However, it may be merely a timing pulse. The second output 242 is adapted to provide a control signal that is proportional to the phase between the two signals. Normally this will be a DC signal having zero amplitude when the desired timing exists and a positive or negative polarity when one of the signals is advanced or retarded from the desired level.

The first output 244 of the phase detector 238 is interconnected with the input to an oscillator 246 so as to supply the sync signal thereto. The oscillator 246 may be of a conventional variety. Although the oscillator 246 is adapted to run at a frequency determined by the frequency of the sync signal fed to the input 246, it also includes a control input 250 for receiving a control signal. A control signal applied to this input 250 will be effective to vary the frequency and/or the phase of the oscillations produced by the oscillator 246. The control input 250 is connected to the second output 242 of the phase detector 238 by means of a filter 252. The filter 252 will be effective to suppress spurious signals and allow only the control signal to reach the control input of the oscillator 250. It may thus be seen that oscillator 246 will be controlled by the output signal from the phase detector 238.

The output from the oscillator 246 may be interconnected with a frequency multiplier 254. This multiplier 254 is adapted to change the frequency of the signals from the oscillator 246 so as to provide signals of the desired frequencies for controlling the demodulators 194, 212 and 228. This multiplier 254 may include means for multiplying and/or dividing the frequencies as is well known in the art. One output 256 from the multiplier 254 is interconnected with the second input 240 to the phase detector 238 so as to supply one of the signals produced by the multiplier 254 to the detector 238.

It may be seen that the sync channel 160 forms a closed loop which will be extremely stable. More particularly, the sync signal produced by head 170 and the signal from the multiplier 254 are supplied to the phase detector 238 where the relative timing of these signals is determined. The phase detector 238 will be effective to produce an error or control signal proportional to the undesirable time difference, if any, between the two signals. The control signal will then be coupled through the filter 252 to the oscillator 246. The operation of the oscillator 246 will then be adjusted so as to reduce the mistiming of the signal from the multiplier 254 to zero. Thus, the frequencies and phases of the signals produced by the multiplier 254 will be locked to the frequency and phase of the sync signal produced by the head 170. It should be noted that irrespective of the speed of the tape 14 or fluctuations in the speed, these relationships will be maintained.

The output 258 of the multiplier 254 is effective to produce a signal having the same frequency and phase as the signal from the output 108 of the master oscillator 106. This output 258 is connected directly to the control input 202 of the balanced modulator 194. When the signal on the input 202 is at one level, the balanced demodulator 194 will permit the in phase signal on the input 198 to reach the output 204. When the control signal on input 200 changes to another level, the out of phase signal on input 200 will pass through the demodulator 194 to the output 204. It will thus be seen that the demodulator 194 will be effective to demodulate the component signal produced by the head 164 at a time and frequency corresponding to the control signal.

If the control signals supplied to the modulator 46 are synchronized with the control signal supplied to the demodulator 194, the phases of the modulated signal will be reversed in exact registry with the original phase reversals. As a result the demodulator 194 will be effective to demodulate the component signal. The demodulated signal will be substantially identical to the portion of the original video signal between ¼F and ¾F that produced the component signal.

The output 258 from the multiplier 254 is also interconnected with the control input 218 to the demodulator 212 by means of a phase shifter 260. This phase shifter 260 may be substantially identical to the phase shifter 114 so as to shift the control signal by 90°. The demodulator 212 will thus be effective to alternately pass the in phase and out of phase signals on the inputs 214 and 216 to the output 220. The third or cosine component signal will thus be demodulated to produce a resultant signal. This resultant signal will correspond to the portion of the video signal between ¼F and ¾F that was embodied in the third or cosine component signal. This will be in the same frequency band (¼F to ¾F) as the demodulated sine signal on the output 204. However, due to the 90° phase shift in the control signals and the resultant sine-cosine relationship between the component signals, the two demodulated signals will not be identical to each other. When the two demodulated signals are applied to the inputs 178 and 180 and added together by the adder amplifier 176, the spurious noises and miscellaneous signals will tend to cancel each other out so that only the portion of the video signal between ¼F and ¾F will remain.

The second output 262 from the multiplier 254 is interconnected with the control input 230 to the balanced demodulator 228. This signal will have the same frequency and phase as the signal on the output 110 from the master oscillator 106 and, accordingly, will normally be double the frequency of the signal on the first output 258. This second harmonic signal will be effective to cause the demodulator 228 to pass either the in phase signal from the output 224 or the out of phase signal from the output 226 in exact synchronism with the inversions of the phase by the modulator 94. The resultant demodulated signal will be in a frequency band which extends from about ¾F to F and will correspond to the portion of the video signal in the same band of frequencies. This signal will then be fed to the input 182 of the added amplifier 176 so as to be added to all of the other demodulated signals.

It may thus be seen that the original video signal will be reproduced and present on the output 184.

It can be appreciated that the successful operation of the foregoing reproduction system is dependent upon all of the various component signal and control signals being in a phase or time relationship which is substantially identical to the time or phase relationship of the control and component signals in the record portion.

In the event of flutter, i.e., fluctuations in the velocity of the tape 14, the closed loop sync channel 160 will be effective to maintain the various control signals accurately synchronized with the various component signals. Thus, flutter will not affect the accuracy of the recombining of the various component signals.

In the event that there is a skewing of the tape 14 during recording or reproducing, the tracks will pass the heads at differing times and the signals reproduced by the heads 162 to 170 will not have the same time and phase relationship as the signals recorded by the record heads. However, the reproduction portion 264 of the skew corrector 122 will be effective to compensate for the variations in the time and phase of the signals.

Figure 4:
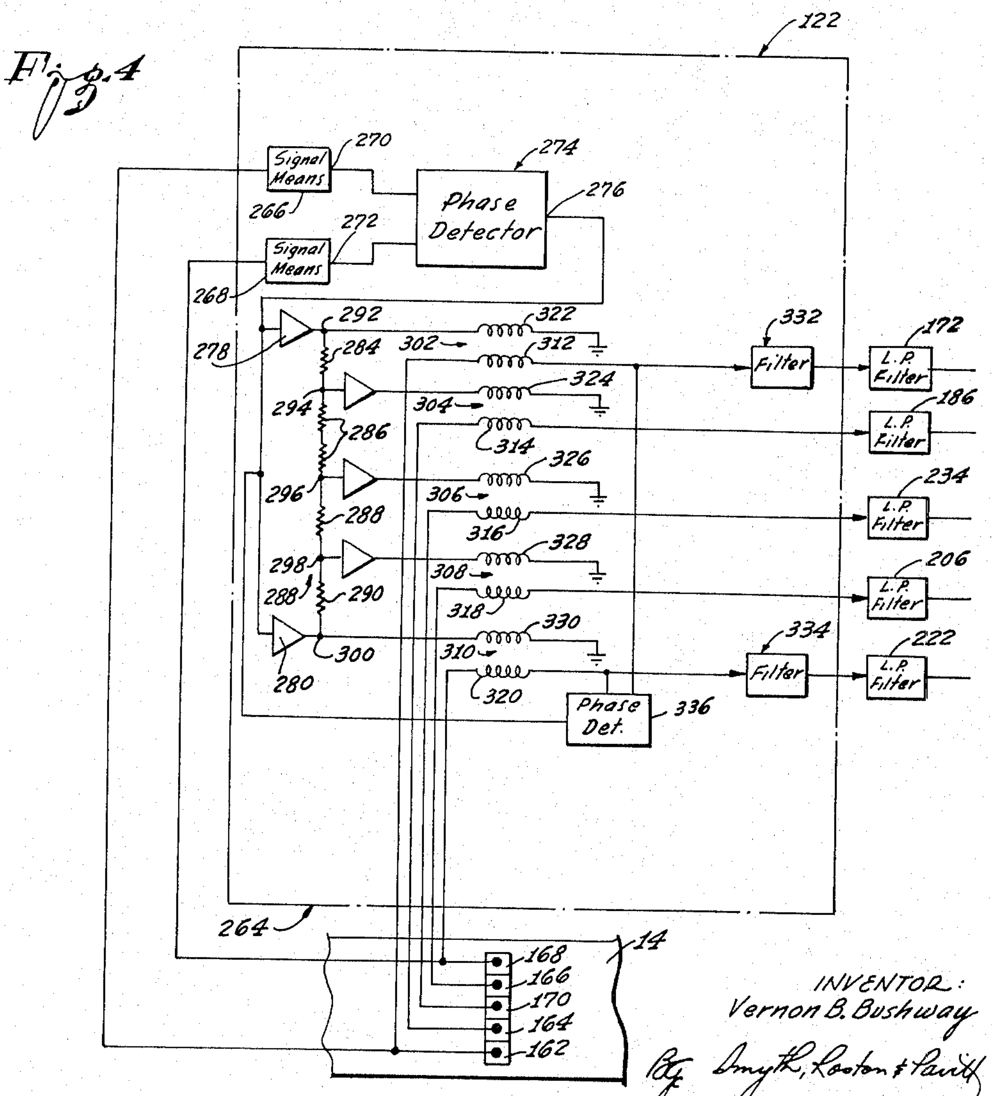
FIGURE 4 is a diagram of a portion of the reproducing means of FIGURE 2.

As best seen in FIGURE 4, the reproduction portion 264 of the skew corrector 122 includes a pair of signal means 266 and 268. Each of the signal means 266 and 268 is connected to a respective one of the pickup heads so as to receive the reference signals. In the present instance, the means 266 and 268 are connected to the heads 162 and 168 that scan the tracks recorded by heads 34 and 102 and contain the reference signals.

The exact structure of these means will be dependent primarily on the nature of the reference signals that have been recorded. If the reference signals are continuously recorded sine waves, the means 266 and 268 will be amplifiers and also filters for separating the reference signals from the surrounding component signals. If the reference signals are pulses periodically recorded during the sync portion of a video signal, the means will also include a filter for suppressing the video portion of the signal and leaving only the reference pulses.

It may thus be seen that the means 266 and 268 are responsive only to the reference signals and will be effective to produce signals on the outputs 270 and 222 having the same time and phase relationship as the reproduced reference signals. In the event the switch 132 was set to engage contact 130 so that the compensator 124 was operating in a continuous mode, the means 266 and 268 will be effective to produce a continuous pair of signals. However, if the switch 132 was set to contact 148 with the compensator 124 operating in a periodic mode, the means 266 and 268 will be effective to generate only an intermittent pair of reference signals.

The signal means 266 and 268 are interconnected with two separate inputs to a phase detector 274. This phase detector 274 is effective to compare the time or phase of the two reference signals and produce an error signal on the output 276. The error signal will have a magnitude proportional to the difference in phase between the reference signals. This error signal will thus be a function of the amount of skewing of the tape 14 during recording and reproducing and will be proportional to the amount of error in the phase of the reproduced component signals.

The output of the plane detector 274 is interconnected with a pair of push-pull amplifiers 278 and 280 so as to supply the error signal thereto. Since the error signal will normally be of the DC or slowly varying variety, the amplifiers 278 and 280 may be of the DC or direct coupled variety.

The outputs of the two amplifiers 278 and 280 are interconnected with each other by means of a voltage dividing network 282 having a plurality of resistors. It may be seen that the two amplifiers 278 and 280 will maintain a voltage across the network 282 that is proportional to the error signal. The junctions between the various resistors 284, 286, 288 and 290 will thus have potentials that are some fraction of the error voltage. The proportions of the resistors 284 to 290 in the resistive network 282 are proportional to the lateral spacing of the heads 162 to 170. It may be seen that since the skewing of the tape 14 is a linear effect, the voltages at the junctions 292, 294, 296, 298 and 300 will be proportional to the skew of the tape 14 and the phase errors of the reproduced component signals.

The output of the phase detector 274 is interconnected with a pair of push-pull amplifiers 278 and 280 so as to supply the error signal thereto. Since the error signal will normally be of the DC or slowly varying variety, the amplifiers 278 and 280 may be of the DC or direct coupled variety.

The outputs from the two amplifiers 278 and 280 and the junctions 292, 294, 296, 298 and 270 between the resistors 284, 286, 288 and 290 are interconnected with a plurality of delay lines 302, 304, 306, 308 and 310. Each of the delay lines 302 to 310 includes a delay section 312, 314, 316, 318 and 320 and a control winding 322, 324, 326, 328 and 330. The control winding is juxtaposed to the delay section and the magnitude of the signal in the control winding will be effective to control the amount of delay experienced by a signal moving through the delay section. Each of the delay sections 312, 314, 316, 318 and 320 are connected between the pickup heads 162 to 170 and the filters 172, 186, 206 and 222 and the phase shifter 234. It may thus be seen that each of the component signals and the sync signal will be delayed as a function of the control signals in the control windings 322, 324, 326, 328 and 330.

Each of the delay sections 312, 314, 316, 318 and 320 are interconnected with low pass filters 172, 186, 206, 222, and 234 respectively so as to feed the delayed component signals thereto. In order to avoid noise from the reference signals, filters 332 and 334 may be provided between the control windings 312 and 320 and the filters 172 and 222. These filters 332 and 334 may be very narrow band or notch filters tuned to just the frequency of the reference signals. These filters 332 and 334 will thus form a trap for the reference signal but will not distort the rest of the component signal.

When a signal is being reproduced by the reproduction portion 12, the heads 162 to 170 will reproduce the various component and sync signals. These signals will be fed through the delay sections 312 to 320 to the filters 172, 186, 206, 222 and 234 respectively. At the same time, the reference signals will be fed into the signal means 266 and 268 whereby the phase detector 274 will produce an error signal. The error signal will be a function of the magnitude and direction of skew of the tape and the phase errors in the component and sync signals.

The error signal will then be coupled through the push-pull amplifiers 278 and 280 so as to be applied across the network 282. The various junctions 292, 294, 296, 298 and 300 will then have a voltage thereon that is proportional to the amount of skew at one of the heads. This voltage will then be applied to the respective control windings 322 to 330 so as to produce corresponding delays in the signals in the sections 312 to 320. As a result, the signals will be delayed by an amount that will insure each of the component and sync signals being properly timed with respect to each other. This, in turn, will insure the signals being demodulated at the right times to produce an accurately reproduced signal.

It should be noted that if the delay lines 302 to 310 are functioning correctly, the reference signals from the delay sections 312 and 320 will be restored to exact phase coincidence. In order to form a closed loop and insure exact registry of the signals, a phase detector 336 may be connected to the outputs of the sections 312 and 320. This detector 336 will be effective to compare the phase of the two signals and produce an error signal. This error signal is then coupled back to the inputs to the push-pull amplifiers 278 and 280 so as to supplement the error signal from the detector 274. It will thus be seen that a closed loop will be formed that will very accurately control the timing of the reproduced component and sync signals.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. In a tape recording system for recording a video signal having a plurality of periodic line segments separated by sync segments, the combination of:

first multiplex means for dividing the video signal into a plurality of a narrow band component signals having predetermined time relationships to each other, reference means responsive to the sync segments of the video signals for generating a pair of reference signals during the sync segment and having a predetermined time relation therebetween, recording means interconnected with the first multiplex means and with the reference means, said recording means being effective to record the component signals on a plurality of parallel tracks extending longitudinally of the tape and to record the two reference signals during the sync segments on a pair of parallel tracks that extend longitudinally of the tape and are laterally spaced from each other, playback means for scanning the tape and reproducing the pair of reference signals and the component signals, means interconnected with the playback means and responsive to the time relation between the reproduced reference signals to provide a plurality of error signals, a separate time delay means for each of the component signals, said time delay means being interconnected with the playback means and with the last means for delaying the reproduced components in response to error signals to thereby restore the reproduced component signals to the original predetermined time relationship, and second multiplex means interconnected with the time delay means and responsive to the time delayed reproduced component signals to combine them into a video signal.

2. In a tape recording system for recording a video signal having a plurality of periodic line segments separated by a plurality of sync segments, the combination of:

first multiplex means for dividing the video signal into a plurality of narrow band component signals having predetermined time relationships to each other, a sync separator effective to suppress the line segments of the video signal and to pass only the sync segments, reference means interconnected with the sync separator and responsive to the sync segments for generating a pair of reference signals during each of the sync segments, said reference signals having a predetermined time relation therebetween, recording means interconnected with the first multiplex means and with the reference means, said recording means being effective to record the component signals on a plurality of parallel tracks extending longitudinally of the tape and to record the two reference signals on a pair of parallel tracks that extend longitudinally of the tape and are laterally spaced from each other, a separate time delay means for each of the component signals interconnected with the playback means whereby each of the component signals will pass through its respective delay means, means interconnected with the playback means and responsive to the time relation between the reproduced reference signals to provide a separate error signal for each of the time delay means, said last means being interconnected with the time delay means to supply the error signals thereto so as to vary the timing of the reproduced component signals to maintain them in said predetermined relation, and second multiplex means interconnected with the time delay means for combining the time delayed reproduced component signals to form a video signal.

3. A frequency division multiplexer for dividing an original wide band signal into a plurality of narrow band component signals and for recording the narrow band component signals into a plurality of different tracks on the medium and for reproducing the component signals and recombining the component signals into the original wide band signal where the wide band signal has a particular frequency range, said multiplexer including the combination of:

at least a pair of first multipliers for receiving the wide band signal, each of the multipliers having a control input, means for continuously generating at least a pair of control signals at a particular frequency related to the frequency range of the wide band signal, said means being interconnected with said control inputs for causing the multipliers to continuously multiply the original signal by +1 at particular times and −1 at other times in accordance with the characteristics of the control signals to continuously provide the plurality of component signals, means for converting the control signals into resultant signals having frequencies less than but related to the frequency range of the wide band signal, means for recording the resultant signals in different tracks in the plurality on the medium, means for recording a pair of reference signals in a pair of spaced tracks in the plurality on the medium, means for reproducing the resultant signals and the reference signals from the medium, at least a pair of second multipliers for receiving the resultant signals reproduced from the medium, said second multipliers having control inputs for providing control signals and being responsive to the control signals to multiply the resultant signals by +1 at the particular times and −1 at the other times in accordance with the characteristics of the control signals to continuously provide a plurality of product signals, means responsive to the reference signals for operating upon the reference signals to produce for each track in the plurality a control signal having characteristics dependent up on the relative characteristics of the reference signals and the relative position of the track in the plurality, means responsive to the product signals and the control signals for the individual tracks in the plurality for adjusting the characteristics of the product signals for the individual tracks in accordance with the characteristics of the control signals for the individual tracks, and means interconnected with the last mentioned means to combine the adjusted product signals to produce the original wide band signal.

4. In a frequency division multiplexer for dividing an original wide band signal into a plurality of narrow band component signals and for recording the narrow band component signals in a plurality of tracks on a medium, said multiplexer including the combination of:

an input for receiving the original wide band signal, at least a pair of multipliers interconnected with the input for having the wide band signal transferred thereto, each of the multipliers being constructed to continuously multiply the original signal by +1 at particular times and −1 at other times, first means for continuously generating at least a pair of control signals for continuously controlling the multiplication of the original signal by +1 and −1 in a particular phase displacement to each other in accordance with the characteristics of the control signals to obtain a pair of resultant signals having at each instant a particular phase displacement relative to each other, means interconnecting said first means with the multipliers for causing each of the multipliers to continuously multiply the original signal by +1 at the particular times and −1 at the other times in accordance with the characteristics of the respective control signals to obtain the pair of resultant signals in accordance with the phase displacement between the control signals, means connected to the last mentioned means for recording the resultant signals in a pair of tracks on the medium, means for producing a pair of reference signals, and means for recording the reference signals in a pair of spaced tracks in the plurality on the medium.

5. The combination set forth in claim 4 wherein the wide band signal provides video information in a plurality of different horizontal lines and where the wide band signals include sync signals defining each line and wherein the reference signal means produce the reference signals only during the occurrence of the sync signals.

6. In a frequency division multiplexer for dividing an original wide band signal into a plurality of narrow band component signals and for recording the signals into a plurality of different tracks on a medium where the wide band signal has a particular frequency range and represents video information in a plurality of horizontal lines and has a sync signal in each line and the narrow band of the component signals has a particular frequency relationship to the particular frequency range of the wide band signal but less than the particular frequency range of the wide band signal, said multiplexer including the combination of:

an input for receiving the original wide band signal, a plurality of multipliers interconnected with the input for receiving the original wide band signal from the input, a generator having a separate output for each of the multipliers, said generator being constructed to continuously generate at least a pair of signals having a particular frequency related to the particular frequency range of the wide band signal and having a particular phase displacement relative to each other, a pair of control inputs each interconnected between an individual one of the multipliers and one of the outputs to the generator to receive an individual one of the signals from the generator, each of the control inputs being effective to cause its multiplier to continuously multiply the original signal at the same frequency and phase as the respective signal from the generator to provide a continuous product signal representing the product of the wide band signal and the individual signal from the generator, a pair of separate filters each interconnected with an individual one of said multipliers to filter the product signal from the individual multiplier, said filter having pass bands equal to the bandwidth of the component signals, means for recording the filtered product signals in individual tracks in the plurality on the medium, means for providing reference signals during the production of the sync signal for each line, and means for recording the reference signals in a pair of spaced tracks in the plurality on the medium.

7. In a frequency division multiplexer for combining a plurality of narrow band component signals into a wide band signal having a particular frequency range where each of the narrow band component signals has been formed by obtaining the product of the wide band signal and a continuous multiplier signal variable between values of +1 and −1 at a frequency related to the particular frequency range and in a particular phase displacement relative to the multiplier signals for the other component signals and where the component signals have been recorded in individual tracks on a medium and where reference signals have also been recorded in at least a pair of spaced reference tracks on the medium, said multiplexer including the combination of:

means for reproducing the signals from the different tracks on the medium, a plurality of separate channels each connected to the reproducing means to receive the signals reproduced from an individual one of the tracks on the medium, a plurality of separate multipliers each being associated with an individual one of the channels for receiving the respective component signal in the channel, control means for generating a plurality of continuous multiplier signals each variable between the values of +1 and −1 at the frequency related to the particular frequency range and in the particular phase displacement relative to the multiplier signals for the other component signals, a plurality of multiplier means interconnecting the control means with the different channels in the plurality for causing each of the multipliers to alternately multiply the associated component signal by +1 and −1 in accordance with variations in the associated multiplier signal to obtain resultant signals for each of the individual tracks on the medium, means responsive to the reference signals reproduced from the spaced reference tracks on the medium for operating upon the reference signals to produce control signals having characteristics dependent upon the relative characteristics of the reference signals at each instant of time, means responsive to the control signals for producing a control signal for each of the individual tracks in accordance with the characteristics of the control signals produced for the spaced reference tracks, means responsive to the control signals and the resultant signals for the individual tracks for adjusting the characteristics of the resultant signals for the individual tracks in accordance with the characteristics of the control signals for the individual tracks, and means for combining the adjusted resultant signals from the multiplier means in the plurality of obtain the wide band signal.

8. The combination set forth in claim 7 wherein the control signal means for the individual tracks includes a network arrangement for producing a control signal for each of the individual tracks in accordance with the characteristics of the control signals produced for the spaced reference tracks and in accordance with the relative disposition of the individual tracks on the medium and wherein the adjusting means for the resultant signals in the individual tracks are responsive to the control signals for the individual tracks for delaying such resultant signals in accordance with the characteristics of such control signals.

9. In a frequency division multiplexer for combining a plurality of narrow band component signals to form a broad band signal having a particular frequency range where each of the narrow band component signals has been formed by obtaining the product of the wide band signal and a continuous multiplexing signal variable between values of +1 and −1 at a frequency related to the particular frequency range and in a particular phase displacement relative to the multiplexing signals for the other component signals and where the component signals have been recorded in individual tracks on a medium and where reference signals have also been recorded in at least a pair of spaced reference tracks on the medium, said multiplexer including the combination of:

means for reproducing the signals recorded in the different tracks on the medium, a plurality of separate channels each connected to the reproducing means to receive an individual one of the component signals reproduced from the medium, a plurality of separate multipliers each connected in an individual one of the channels for receiving the associated component signal, generator means having a plurality of separate outputs for the different multipliers in the plurality, said generator being constructed to generate a plurality of continuous multiplexing signals each variable between values of +1 and −1 at the frequency related to the particular frequency range and in the particular phase displacement relative to the multiplexing signals for the other component signals, a plurality of control inputs each interconnected between an individual one of the multipliers in the plurality and an individual one of the outputs from the generator, each of the inputs being constructed to receive an individual one of the multiplexing signals and actuate its respective multiplier to multiply its respective component signal at the same frequency and phase as the multiplexing signal to provide a resultant signal in accordance with the characteristics of the component signal and the variations of the squarewave between the variations of +1 and −1, means operative upon the reference signals reproduced from the spaced reference tracks for comparing the phases of these signals to produce control signals having characteristics dependent upon such relative phases, means for delaying the resultant signals for each channel in accordance with the characteristics of the control signals, and means interconnected with said last mentioned means to combine said delayed resultant signals to form the wide band signals.

10. The combination set forth in claim 9 wherein the broad band signal represents video information in a plurality of horizontal lines and wherein the broad band signal includes a sync signal for each horizontal line and wherein the reference signals have been recorded during the production of the sync signal for each line and wherein the comparing means is operative to compare the phases of the reference signals during the occurrence of the sync signals to produce the control signals having the characteristics dependent upon such relative phases.

11. In a frequency division multiplexer for combining a plurality of component signals having narrow bandwidths in a wide band signal having a particular frequency range where each of the narrow band component signals has been formed by obtaining the product of the wide band signal and a continuous multiplier signal variable between values of +1 and −1 at a frequency related to the particular frequency range and in a particular phase displacement relative to the multiplier signals for the other component signals and where one of the narrow band signals has been formed directly from the wide band signal and where all of the narrow band signals have been passed through low pass filters constructed to pass signals in a frequency range related to the particular frequency range of the wide band signal and where the component signals have been recorded in individual tracks on a medium and where reference signals have also been recorded in at least a pair of spaced tracks on the medium, means for reproducing the signals recorded in the different tracks on the medium to reproduce the component signals and the reference signals in the different tracks, a plurality of separate inputs for individual ones of the component signals reproduced from the medium, a first channel interconnected with a first input in the plurality for receiving a first component signal in the plurality to continuously pass the first component signal to provide a resultant signal, a pair of channels interconnected with an individual pair of inputs in the plurality for receiving an individual pair of the component signals in the plurality, a multiplier in each of the channels in the pair, control means for generating for each multiplier an individual multiplier signal variable between the values of +1 and − 1 at the frequency related to the particular frequency range and in the particular phase displacement relative to the multiplier signals for the other component signals, means interconnecting the control means with the multipliers for transferring said pair of multiplier signals to the multipliers, each of the multipliers being constructed to vary the associated component signal in accordance with the variations between the values of +1 and −1 in the associated multiplier signal to provide a resultant signal, means for comparing the phases of the signals reproduced from the spaced reference tracks to produce control signals having characteristics dependent upon the characteristics of such relative phases, means responsive to such control signals for delaying the passage of the resultant signals at each instant by an interval of time dependent upon the characteristics of the control signals, and means interconnected with the channels for adding the delayed resultant signals to obtain the production of the wide band signal.

12. The combination set forth in claim 11, including, a network connected to the comparing means for adjusting the characteristics of the control signals for the signals reproduced from the individual tracks in accordance with the relative disposition of such tracks on the medium, the delay means being responsive to the control signals for each of the tracks for delaying the passage of the resultant signals obtained from the individual tracks by an interval of time dependent upon the characteristics of such control signals.

13. In combination for dividing an original wide band signal into a plurality of narrow band component signals and for recording the narrow band signals on a medium and for thereafter reproducing the recorded signals from the medium and reconstructing the wide band signal, said recorder including the combination of:

an input for receiving the original wide band signal, a plurality of multipliers interconnected with the input for receiving the wide band signal, control means for continuously generating a plurality of control signals for the different multipliers and for providing for each of the control signals amplitude characteristics variable between values of +1 and −1 at a particular frequency and in a particular phase relative to the other control signals, a plurality of control inputs each interconnected with an individual one of the multipliers in the plurality, each of the control inputs being interconnected with said control means for receiving an individual one of the control signals and causing the multipliers to multiply the original wide band signal in accordance with the amplitude characteristics of the individual control signal to provide a plurality of resultant signals, a plurality of separate filter means each interconnected with the multipliers for filtering the resultant signals from the multipliers, each of said filters having a pass band that is substantially the same as said narrow band to pass only the component signals, a plurality of separate recording heads each interconnected with an individual one of the filters and each spaced from the other recording heads in the plurality for recording the component signals in an individual track on the medium, means for producing a reference signal, at least a pair of separate recording heads each interconnected with the reference signal means for recording the reference signal in a pair of spaced reference tracks on the medium in a particular timed interrelationship in the reference tracks, means for reproducing the signals recorded in the different tracks on the medium, a second plurality of multipliers for receiving the signals reproduced from the different tracks, second control means for continuously generating a plurality of second control signals for the different multipliers in the second plurality and for providing for each of the second control signals amplitude characteristics variable between values of +1 and −1 at a particular frequency and in a particular phase relationship to the other ones of the second control signals, a plurality of second control inputs each interconnected with an individual one of the multipliers in the second plurality, each of the second control inputs being interconnected with the second control means for receiving an individual one of the second control signals and causing the second multipliers to multiply the reproduced signal in accordance with the amplitude characteristics of the individual one of the second control signals to provide a plurality of second resultant signals, means responsive to the reference signals reproduced from the spaced reference tracks for comparing the phases of such signals to produce control signals having characteristics dependent upon the relative timed relationship of such reference signals, means responsive to the control signals and the second resultant signals for delaying the second resultant signals in accordance with the characteristics of the control signals, a second plurality of separate filter means each interconnected with the last mentioned means for filtering the delayed resultant signals, each of the filter means in the second plurality having a pass band that is substantially the same as said narrow pass band, and means responsive to said signals from the filter means in the second plurality to combine such signals to reproduce the wide band signal.

14. The combination set forth in claim 13 wherein the wide band signal represents video information in a plurality of horizontal lines and includes a sync signal in each line and wherein the reference signal means produce the reference signals only during the production of the sync signal.

15. The combination set forth in claim 13 wherein network means are connected to the comparing means for producing for each track in the plurality a control signal having characteristics dependent upon the characteristics of the control signal produced by the comparing means and upon the relative position of that track upon the medium and wherein the delaying means for each second resultant signal delay such second resultant signal for an interval of time in accordance with the characteristics of the associated control signal.

References Cited

UNITED STATES PATENTS

| | | | |
|---|---|---|---|
| 2,828,478 | 3/1958 | Johnson | 178—6.6 |
| 2,952,745 | 9/1960 | Walker | 178—6.6 |

ROBERT L. GRIFFIN, *Primary Examiner.*

JOHN W. CALDWELL, *Examiner.*

H. W. BRITTON, *Assistant Examiner.*